(12) United States Patent
Poi

(10) Patent No.: US 8,488,750 B2
(45) Date of Patent: *Jul. 16, 2013

(54) METHOD AND SYSTEM OF PROVIDING INTERACTIVE SPEECH RECOGNITION BASED ON CALL ROUTING

(75) Inventor: Parind Poi, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,141

(22) Filed: Nov. 16, 2011

(65) Prior Publication Data

US 2012/0099713 A1    Apr. 26, 2012

Related U.S. Application Data

(63) Continuation of application No. 11/694,497, filed on Mar. 30, 2007, now Pat. No. 8,077,835.

(51) Int. Cl.
*H04M 1/64* (2006.01)

(52) U.S. Cl.
USPC .......................................... 379/88.03; 455/79

(58) Field of Classification Search
USPC ................. 379/88.01–88.04; 455/79, 563
See application file for complete search history.

(56) References Cited

U.S. PATENT DOCUMENTS

| | | | |
|---|---|---|---|
| 5,802,149 A * | 9/1998 | Hanson | 379/88.03 |
| 5,924,070 A * | 7/1999 | Ittycheriah et al. | 704/275 |
| 5,991,368 A * | 11/1999 | Quatse et al. | 379/88.25 |
| 6,061,653 A * | 5/2000 | Fisher et al. | 704/256.5 |
| 6,081,782 A * | 6/2000 | Rabin | 704/275 |
| 6,226,532 B1 * | 5/2001 | Kim et al. | 455/563 |
| 6,658,455 B1 * | 12/2003 | Weinman, Jr. | 709/203 |
| 6,754,325 B1 * | 6/2004 | Silver et al. | 379/211.02 |
| 6,996,227 B2 * | 2/2006 | Albal et al. | 379/355.05 |
| 7,245,712 B2 * | 7/2007 | Hines | 379/213.01 |
| 7,818,295 B2 * | 10/2010 | Mihaylo et al. | 707/618 |
| 2001/0011028 A1 * | 8/2001 | Wendelrup | 455/563 |
| 2005/0130596 A1 * | 6/2005 | Naick et al. | 455/67.11 |

\* cited by examiner

*Primary Examiner* — Simon Sing

(57) ABSTRACT

A speech recognition process and system are used for interactive telecommunication. A caller is prompted for input. Each of the phrases represents a destination for routing the call. The response utterance is matched by the system to one of the phrases and the call is routed to the corresponding destination. If the call thereafter has been redirected to a destination representing another of the phrases, speech recognition training data are generated for mapping the utterance to the redirected destination.

18 Claims, 6 Drawing Sheets

US 8,488,750 B2

METHOD AND SYSTEM OF PROVIDING INTERACTIVE SPEECH RECOGNITION BASED ON CALL ROUTING

RELATED APPLICATIONS

The present application is a continuation of U.S. patent application Ser. No. 11/694,497, filed on Mar. 30, 2007; the entirety of which is incorporated herein by reference.

BACKGROUND INFORMATION

Speech recognition plays an important role in communication systems, both for gathering information from and for supplying information to users. Traditionally, interactive voice response (IVR) systems have relied upon a combination of dual-tone multi-frequency (DTMF) and speech inputs to acquire and process information. As transactions have increased in complexity, requiring input of a quantity of numbers, letters, and words, typical DTMF interfaces have become impractically slow in accommodating the required complex data entry. Thus, organizations are becoming more reliant upon voice based systems to replace or augment DTMF input. Unfortunately, voice based systems have introduced new, more challenging issues pertaining to the intricacies of spoken language and the infinite variations of human utterance.

Therefore, there is a need for an approach to improve speech recognition accuracy.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF PREFERRED EMBODIMENTS

An apparatus, method, and software for providing speech recognition are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although various exemplary embodiments are described with respect to speech recognition of specific phrases, it is contemplated that these embodiments have applicability to generalized speech recognition using equivalent interfaces and operations.

Figure 1:
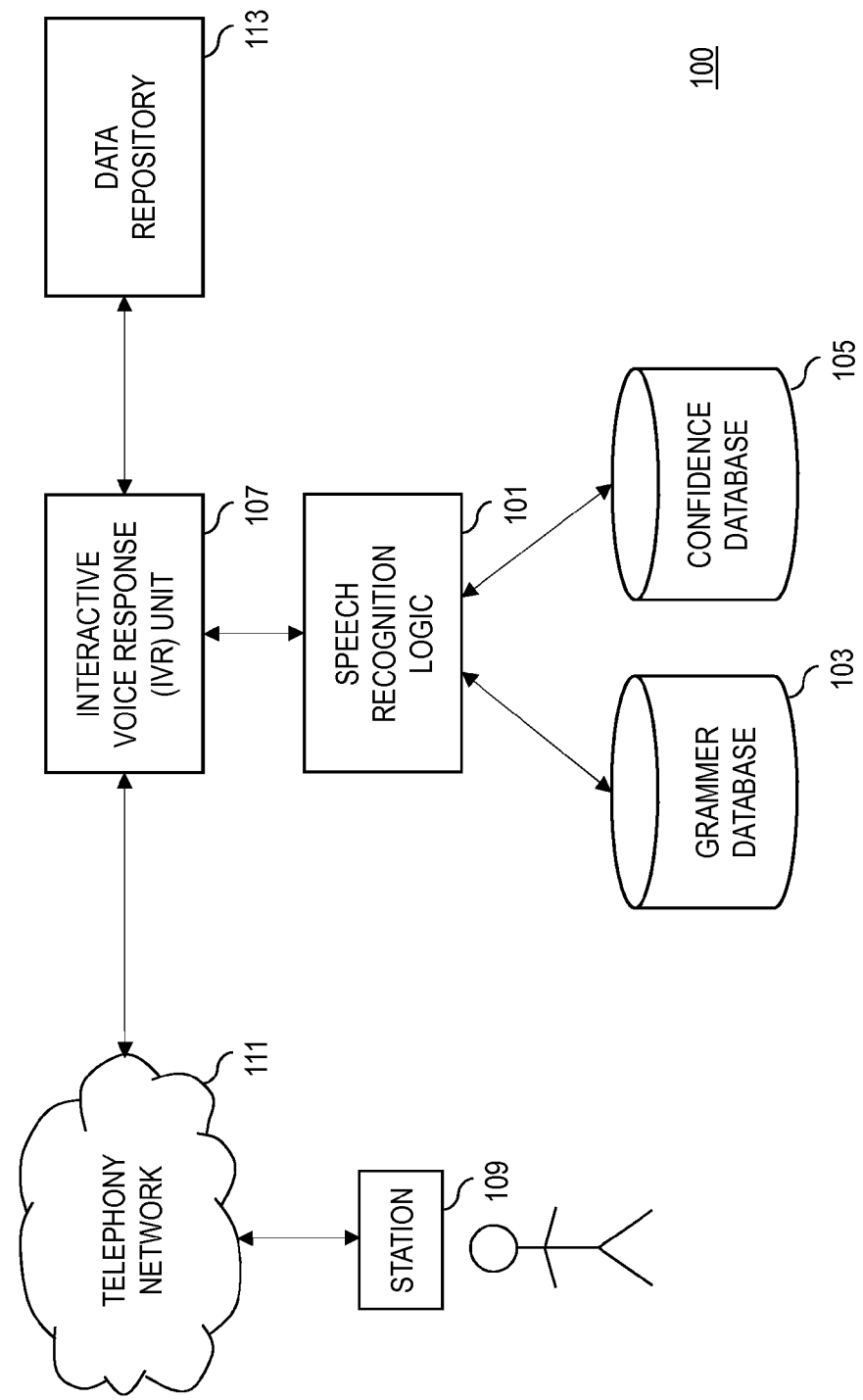
FIG. 1 is a diagram illustrating a communication system capable of providing speech recognition in accordance with an exemplary embodiment.

FIG. 1 is a diagram illustrating a communication system capable of providing speech recognition to acquire a word or phrase, in accordance with an exemplary embodiment. A communication system 100 includes a speech recognition system (or logic) 101 that utilizes a grammar database 103, and a confidence database 105. The speech recognition system 101 operates with an interactive voice response (IVR) unit (or system) 107, which receives a voice call from a station 109 over a telephony network 111. The telephony network 111 can be a circuit-switched system or a packetized voice network (e.g., Voice over Internet Protocol (VoIP) network). The packetized voice network 111 can be accessed by a suitable station 109—e.g., computer, workstation, or other device (e.g., personal digital assistant (PDA), etc.) having supporting microphone and speaker functionality. The IVR system 107, among other functions, collects and provides data to users. The IVR system 107 is more fully explained with respect to FIG. 2. Data collection is supported by a data repository 113.

For the purposes of illustration, the speech recognition system 101 is described with respect to the recognition of audio signals representing any of a plurality of stored phrases. Acquisition of such phrase can be a difficult task for conventional systems that utilize dual-tone multi-frequency (DTMF) input interfaces. For instance, DTMF interfaces become increasingly more impractical as the quantity of letters contained within an individual phrase increases. Also, many phone designs (notably cellular phones) require the speaker and the dial-pad to be constructed together, such that it is inconvenient for the user to use the dial-pad and listen to voice prompts. As a result, speech recognition has been introduced to supplement DTMF interfaces.

Traditional speech recognition interfaces are highly dependent upon grammatical context and ordinary pronunciation rules to achieve accurate conversion results. However, these techniques can be inadequate if utterances have no significant grammatical context that can be used to differentiate among possible conversion alternatives. Further complications arise if there are a disproportionately large number of nonstandard pronunciation variations. Thus, phonetic variability is exemplified not only by the loss of context but also by the acoustic differences between phonemes themselves.

Further, speech recognition technology is hindered by a set of characteristic complexities independent from the types of utterances being converted. For instance, acoustic variability introduced by environmental background noise, microphone positioning, as well as transducer quality, add to the loss of conversion accuracy. In addition, speaker variability resulting from physical and emotional states, speaking rates, voice quality and intensity, sociolinguistic background, dialect, as well as vocal tract size and shape also contribute to the loss of recognition accuracy.

Returning to FIG. 1, the speech recognition system 101, which is more fully described below with respect to FIG. 3, can support a myriad of applications involving interaction with a human user, such as call flow processing, directory assistance, commerce transactions (e.g., airline ticketing, stock brokering, banking, order placement, etc.), browsing/collecting information, and the like.

Although not shown, the IVR system 107 can access the data repository 113 via a data network, which can include a local area network (LAN), a wide area network (WAN), a cellular or satellite network, the Internet, etc. Further, those of ordinary skill in the art will appreciate that data repository 113 can be directly linked to or included within IVR system 107. As such, data repository 113 can be any type of information store (e.g., database, server, computer, etc) that associates personalized information with user utterances. For example, this personalized information can include any one or combination of a birth date, an account number (e.g., bank, credit card, billing codes, etc.), a social security number (SSN), an address (e.g., work, home, internet protocol (IP), media access control (MAC), etc.), telephone listing (home, work, cellular, etc.), as well as any other form of uniquely identifiable datum, e.g., biometric code, voice print, etc.

The data repository 113 can be configured to allow reverse searching for a user's name using one or more of the above listed personalized information forms. Moreover, data repository 113 can be automatically updated and maintained by any source, including third party vendors.

Although the speech recognition system 101 is shown as a separate component, it is contemplated that the speech recognition system 101 can be integrated with the IVR system 107.

Figure 2:
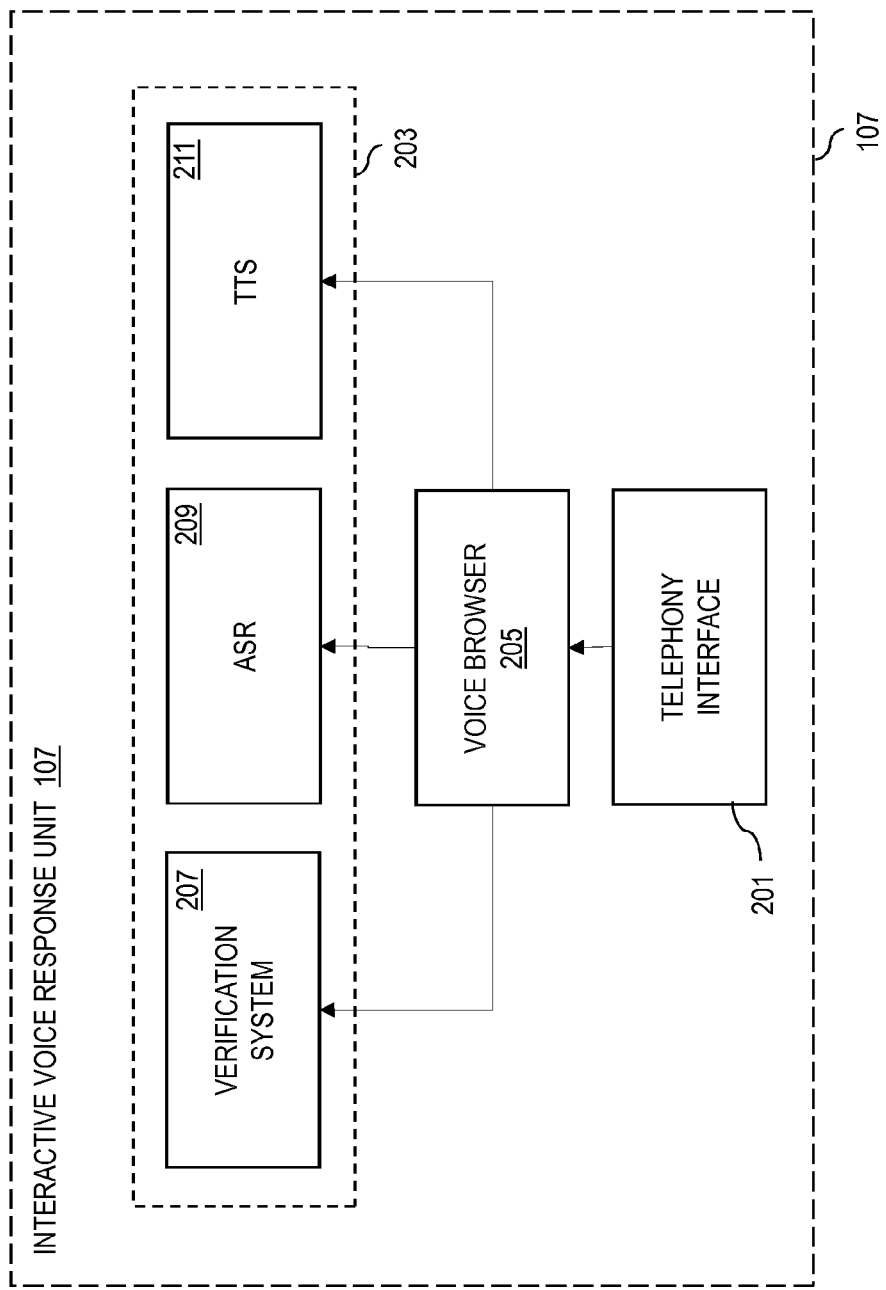
FIG. 2 is a diagram of an exemplary interactive voice response (IVR) unit that may be employed in the embodiment of FIG. 1.

FIG. 2 is a diagram of an exemplary interactive voice response (IVR) system. In this example, the IVR system 107 includes a telephony interface 201, a resource manager 203, and a voice browser 205. The IVR system 107 utilizes the telephony interface 201 for communicating with one or more users over the telephony network 111. In alternative embodiments, other interfaces are utilized depending on the access method of the user. Moreover, although the IVR system components are shown as separate, distributed entities, the IVR system 107 can incorporate some or all of the functionalities into a single network element.

As shown, the resource manager 203 provides various speech resources, such as a verification system 207, an automatic speech recognizer (ASR) 209, and a text-to-speech (TTS) engine 211. The TTS engine 211 converts textual information (digital signal) from the voice browser 205 to speech (analog signal) for playback to a user. The TTS engine 211 accomplishes this transition through a front-end input and a back-end output. The input converts raw text into its written-out word equivalent through text normalization, pre-processing, and/or tokenization. Words are then assigned phonetic transcriptions and divided into prosodic units, e.g., phrases, clauses, and/or sentences. Using this combination of phonetic transcriptions and prosody arrangements, the front-end input communicates a symbolic linguistic representation to the back-end output for synthesizing. Based on the desired level of naturalness or intelligibility, the back-end output is capable generating speech waveforms through any one of the following synthesis processes: concatenative, unit selection, diphone, domain-specific, formant, articulatory, Hidden Markov Model (HMM), and other like methods, as well as any hybrid combination thereof. Through the synthesis process, the back-end output generates the actual sound output transmitted to user.

The ASR 209 can effectively behave as the speech recognition system 101, or alternatively be an interface to the speech recognition system 101; the particular embodiment depends on the application. The ASR 209 effectively converts a user's spoken language (represented by analog signals) into textual or an equivalent symbolic form (digital signal) for processing by the voice browser 205 and/or verification system 207.

The voice browser 205 can play pre-recorded sound files to the user in lieu of, or in addition to, use of the TTS engine 211. The resource manager 203 can include an analog-to-digital and digital-to-analog converter (not shown) for signaling between the station 109, for example, and the voice browser 205. Further, in alternative embodiments, the voice browser 205 may contain speech recognition and synthesis logic (not shown) that implements the above, thereby extracting meaning from the user's spoken utterances and producing acoustic renditions of text directly.

The verification system can be linked to the voice browser 205, the ASR 209, or both components depending upon the method of authentication desired. Accordingly, a user name, password, code, or other unique identification can be required by the verification system 207 for limiting access to user information. In this manner, users can be required to provide this information using either spoken utterances transmitted through the ASR 209 or DTMF signals transmitted via telephony interface 201. Alternatively, the verification system 207 can provide an unobtrusive level of security by positively identifying and screening users based on their voice prints transmitted from telephony interface 201 and/or the voice browser 205. Thus, in either embodiment, the verification system 207 can keep sensitive transactions secure.

The voice browser 205 functions as a gateway between a call, for example, and a variety of networked applications. The voice browser 205 can employ a microphone, keypad, and a speaker instead of a keyboard, mouse, and monitor of a conventional web-based system. The voice browser 205 processes pages of markup language, such as voice extensible markup language (VoiceXML), speech application language tags (SALT), hypertext markup language (HTML), and others such as wireless markup language (WML) for wireless application protocol (WAP) based cell phone applications, and the World Wide Web (W3) platform for handheld devices, residing on a server (not shown). Since a broad level of markup languages are supported, the voice browser 205 can be configured accordingly, to include a VoiceXML-compliant browser, a SALT-complaint browser, an HTML-compliant browser, a WML-complaint browser or any other markup-language complaint browser, for communicating with users. As with standard web services and applications, the voice browser 205 can utilize a standardized networked infrastructure, i.e., hypertext transport protocol (HTTP), cookies, web caches, uniform resource locators (URLs), secure HTTP, etc., to establish and maintain connections.

Figure 3:
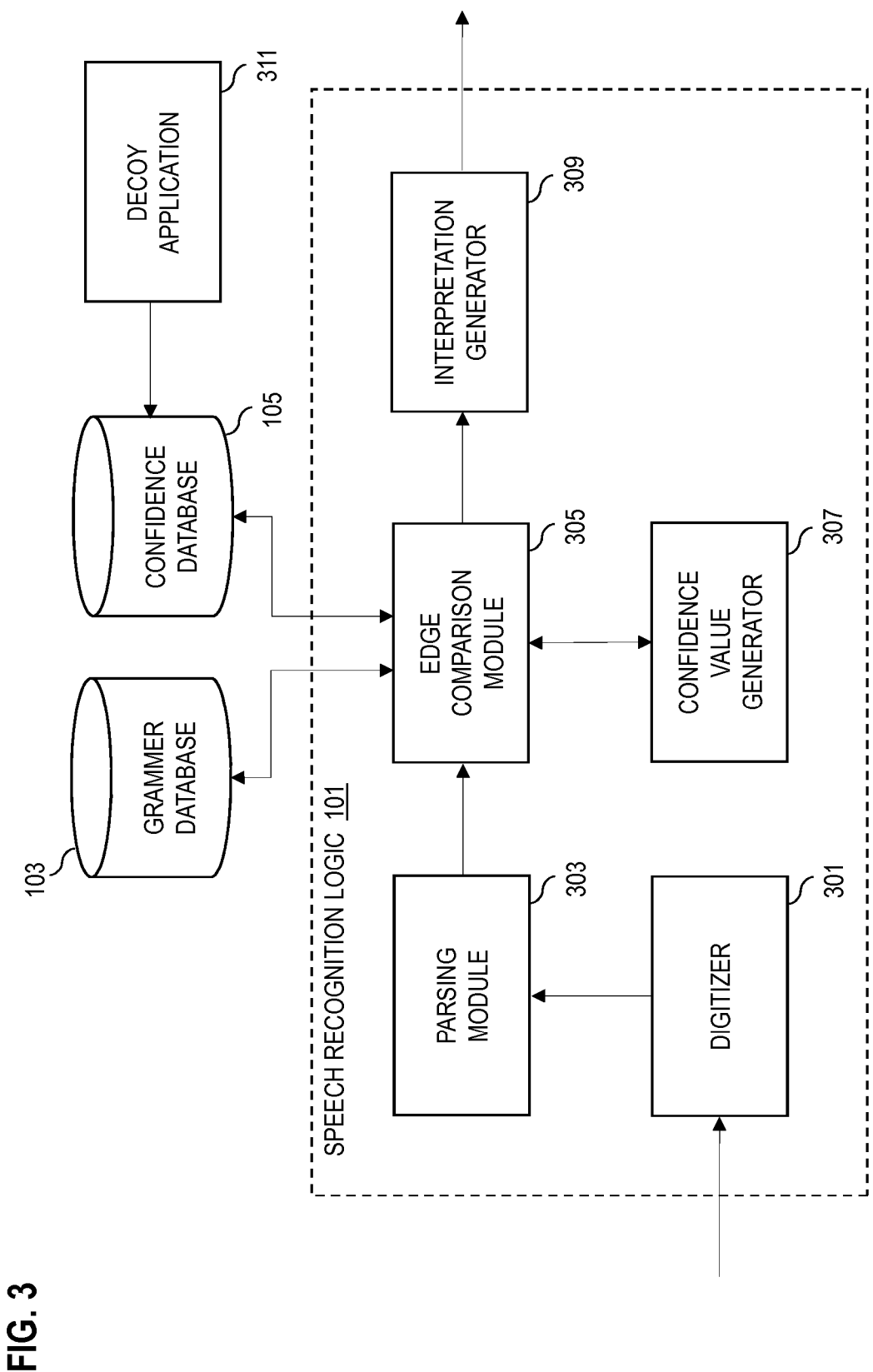
FIG. 3 is a diagram of a speech recognition system that may be employed in the embodiment of FIG. 1.

FIG. 3 is a diagram exemplifying a speech recognition system that may be implemented in the system of FIG. 1. The speech recognition system 101 can provide speaker dependent and/or independent automatic voice recognition of acoustic utterances from the user. Accordingly, the speech recognition system 101 processes voice communications transmitted over telephony network 111 to determine whether a word or a speech pattern matches any grammar or vocabulary stored within a database (e.g., grammar database 103 or confidence database 105). The grammar database 103 is populated with possible combinations of phrases that may be user option utterances. According to an exemplary embodiment, the grammar database 103 can be built according to a variety of formats, e.g., XML, Grammar Specification Language (GSL), etc.

In alternative embodiments, the database 103 can include any grammar database including phrases and spellings of those phrases as well as a dictionary database, another grammar database, an acoustic model database, and/or a natural language definition database. Dictionary databases contain phonetic pronunciations for words used in grammar databases. Acoustic model databases define, among other things, the languages that the speech application utilizes.

While only one grammar database 103 and one confidence database are shown, it is recognized that multiple databases may exist controlled by, for instance, a database management system. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes.

As seen in FIG. 3, a supplemental "confidence database" 105 can be used in conjunction with the grammar database 103 to produce accurate recognition of user utterances. The confidence database 105, in an exemplary embodiment, can be derived from the primary grammar database 103, such as an N-Best list (with N being an integer that can be set according to the particular application). The N-Best result is a list of items returned from the grammar that correlate well to the caller's utterance. The N-Best list is sorted by likelihood of a match and includes one or more entries. In this process, the correct phrase is added to this N-Best supplemental grammar. According to one embodiment, there is no weighting or preference given to any item in this supplemental name grammar. This smaller subset of the full grammar containing both decoy and the correct phrase will allow for a better recognition of the caller's utterance. This supplemental grammar database can be dynamically built.

A decoy application 311 is utilized, according to an exemplary embodiment, to generate variations of the names within the N-best list to enhance the probability of recognition. These generated names, which can possibly include the correct name, are provided as additional entries into the confidence database 105.

The speech recognition system 101 is configured to process acoustic utterances to determine whether a word or speech pattern matches any phrase stored within the name grammar database 103 and/or the confidence database 105. When a match is identified for a particular utterance (or set of utterances) of the voice communication, the speech recognition system 101 sends an output signal for implementation by the verification system 207 and/or the voice browser 205. Thus, it is contemplated that the speech recognition system 101 can include speaker dependent and/or independent voice recognition. Further, the speech recognition system 101 can be implemented by any suitable voice recognition system capable of detecting and converting voice communications into text or other equivalent symbolic representations.

As such, the speech recognition system 101 may include a digitizer 301 for digitizing an audio input (e.g., speech), a parsing module 303, and an edge comparison module 305, as well as a confidence value generator 307 and interpretation generator 309. Moreover, the speech recognition system 101 makes use of the grammar database 103, confidence database 105 to aid in more accurately recognizing a user's utterance; this process is more fully described with respect to FIGS. 4A and 4B.

In operation, the digitizer 301 accepts acoustic or audio signals (i.e., user utterances) from the telephony interface 201 and converts them into digital signals through an analog-to-digital converter. It is contemplated that the digitization function can be integrated with the telephony interface 201 or with the voice browser 205. Once digitized, the signal is converted into the frequency domain using known methods, e.g., discrete/fast/short form Fourier transform, etc., and combined into a frequency spectrum frame for further processing. Since the human ear can only perceive audible acoustics ranging from 20 Hz to 20 kHz and since the human voice only typically produces utterances within the 500 Hz to 2 kHz range, the digitizer 301 can be optimized to operate within these ranges. The digitizer 301 can include a host of signal processing components, e.g., filters, amplifiers, modulators, compressors, error detectors/checkers, etc., for conditioning the signal, e.g., removing signal noises like ambient noise, canceling transmission echoing, etc.

After the digitizer 301 processes the analog signal, a corresponding digital signal is passed to the parsing module 303 for extracting acoustic parameters using known methods, e.g., linear predictive coding. For instance, the parsing module 303 can identify acoustic feature vectors that includes cepstral coefficients that identify the phonetic classifications and word boundaries of a user's utterance. It is recognized that other conventional modeling techniques can be used to extract one or more characteristics and/or patterns that classify distinctive acoustic portions of the digital signal.

Once parsed, the various acoustic features defined by the parsing module 303 are input into the edge comparison module 309 for comparison with and identification as recognized words, e.g., first, middle, and/or last names of the user. Accordingly, the edge comparison module 305 can use any known speech recognition method and/or algorithm, e.g., hidden Markov Modeling (HMM), as well as the name grammar database 103 and the confidence database 105 to recognize user utterances as words. After the words are identified, the interpretation generator 309 passes an associated equivalent textual or symbolic representation (hereinafter collectively referred to as a "value") to the voice browser 205 and/or verification system 207 for appropriate processing.

In general, a grammar database stores all the possible combinations of user utterances, and associated values, that are validly accepted by a particular speech application. By way of example, a simple grammar, denoted as "YESNOGRAMMAR," can be defined as follows:

```
YESNOGRAMMAR
[
(yes){true}
(no)  {false}
]
```

In this example, the contents of the grammar are contained within the [ ] brackets. Items within the ( ) brackets are used by the edge comparison module 305 for comparison against the acoustic features extracted from the user's utterances. When the acoustic features similarly compare to the items within the ( ) brackets, the value contained within the { } brackets is passed to the interpretation generator 309.

The edge comparison module 305 utilizes a confidence value generator 307 to determine the level of confidence that measures the correlation of a recognized utterance to a value of an item within the grammar database. High confidence values imply greater similarity between the recognized utterance and the value of an item within the grammar database. Conversely, a low confidence value will imply a poor similarity. In cases where an utterance is not recognized, i.e., the confidence value generator 307 perceives no similarity to any item within the grammar, the edge comparison module will produce an "out of grammar" condition and require the user to re-input their utterance.

Using the simple YESNOGRAMMAR defined above, an exemplary speech recognition process is explained as follows. First, the IVR system 107 prompts the user with a question, such as, "Have you ever been to Colorado?" If the user responds "yes," the speech recognition system 101 recognizes the utterance and passes a "true" result to interpretation generator 309 for output to the appropriate device, e.g., voice browser 205, for system processing. If instead the user responded "maybe," the utterance would not compare to either the "yes" or "no" values within the grammar, YESNO-GRAMMAR. As such, a no recognition situation would result and the edge comparison module would produce an "out of grammar" condition and require the user to re-input their utterance.

Grammars are thus used to limit users to those values defined within the grammar, i.e., expected utterances. For instance, if a user was asked to utter a numerical identifier, such as a social security number (SSN), a grammar could limit the first digit to numbers zero through seven since no SSNs begins with an eight or a nine. Accordingly, if a user uttered a SSN beginning with an eight, when the utterance is analyzed by the speech recognition system 101 and compared against the limited grammar, the result will inevitably be an "out of grammar" condition.

Unfortunately, user utterances cannot always be "pigeon holed" into expected utterances. For instance, the speech recognition system 101 utilizing the above YESNOGRAMMAR grammar, would not recognize a user utterance equating to the spoken words of "affirmative" in place of "yes" or "negative" in place of "no." However, an attempt to provide every possible alternative utterance to an expected utterance is impractical, especially when the complexity of the expected utterance increases.

An interactive voice response unit is typically used to front end a call received at a contact center from a customer for providing various available services. The speech system tries to identify the speaker, authenticate if needed, gather the reason for the call, self-serve if possible and/or route the call to the most appropriate agent if the system cannot completely help the caller. Contact center agents are organized as groups. Each group performs a certain set of functions, for example, a billing group, an ordering group, etc. The speech recognition system makes the best judgment about where to route the call. If the call is misdirected, an agent at that center speaks with the caller, identifies the real reason for the call, and routes the call to the appropriate agent.

Figure 4A:
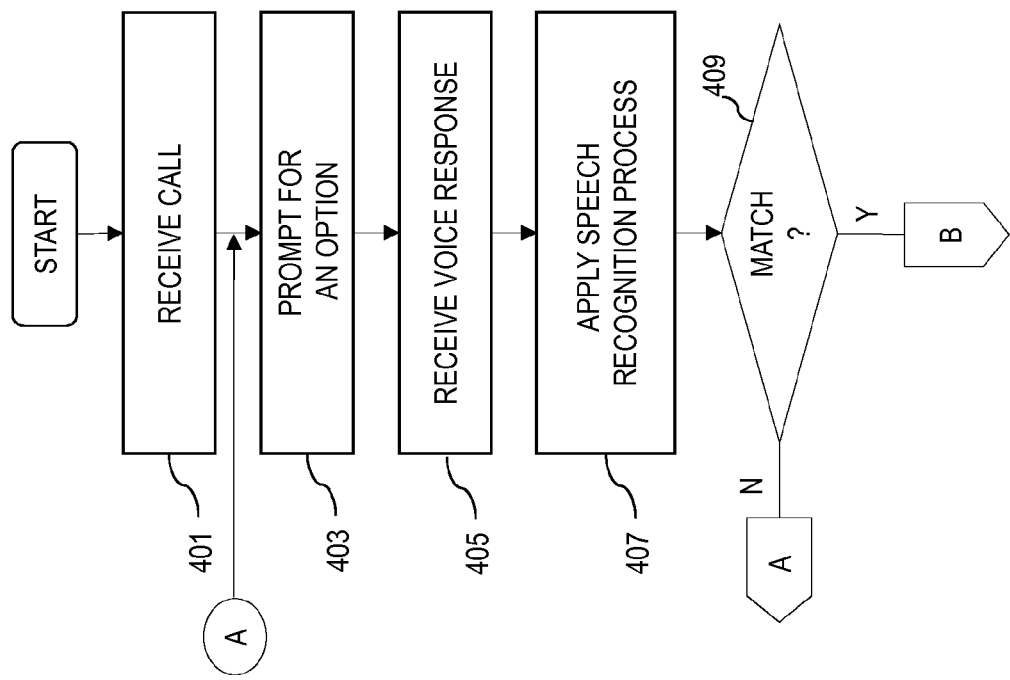
FIGS. 4A and 4B are flowcharts of a speech recognition process, according to an exemplary embodiment.
Figure 4B:
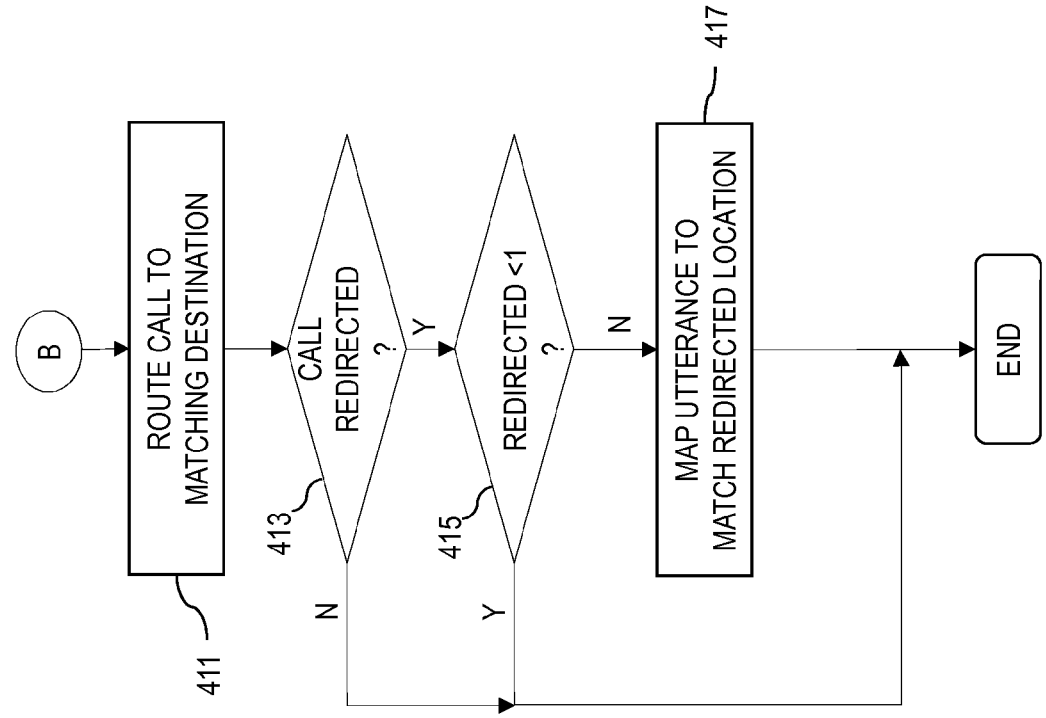

As identification and routing are critical functions, the recognition module that is used to identify the reason for the call needs constant tuning FIGS. 4A and 4B comprise a flowchart of a process for improved training of the speech recognition logic unit in which advantage is taken of information that a call has been misdirected by the unit. This information can be used as training data in which the caller's utterance is mapped to data for the redirected destination. Grammar database 103 (FIG. 1) contains data that represent designated service options. In step 401, an incoming call is received by the service provider and directed to IVR unit 107. At step 403, the caller is prompted to select from a plurality of the designated service options. Alternatively, the caller can be prompted to provide input using natural language. The prompt may be generated by a speech synthesis technique or presented as a recorded message. A voice input is received from the caller in response to the prompt at step 405. At step 407, speech recognition logic 101 processes the voice response utterance data for the purpose of matching data in grammar database 103 that represent the phrases. If the speech recognition step has been unable to identify a match as determined at step 409, a re-prompt message is sent to the caller repeating the request to select one of the available service options, the process reverting to step 403.

If it is determined in step 409 that the caller's utterance has been matched to the grammar database by the speech recognition process, the call is routed to the service center that corresponds to matched utterance at step 411. Upon completion of the call, determination is made at step 413 of whether the call had been redirected after having been routed to the service center. If the call had not been redirected, the system is assumed to have accurately identified the caller's utterance. Therefore, no need then exists to adjust the recognition module and the process ends.

If determination was made at step 413 that the call was redirected, step 415 determines whether the call was completed without further redirection. If determination is made that the call was redirected only a single time, it is assumed that the redirected location corresponds to the intent of the caller's utterance. At step 417, the received caller utterance data are mapped to the grammar base data representing the redirected destination, thereby adjusting the acoustic model to improve speech recognition.

If, however, step 415 determines that the call was again redirected, an assumption cannot be made as to the intended destination of the utterance. While it is possible that the second or subsequent re-directed location corresponds to the intention of the caller, it is also possible that there where several reasons for the call. The original utterance cannot, with certainty, be associated with either of the plurality of redirected destinations. Thus, the process for this call ends without adjustment of the acoustic model.

The process of FIGS. 4A and 4B, therefore, can be utilized to improve conventional interactive speech recognition techniques. The system gains speech recognition training data from routing history. This training data is acquired without the need to prompt the speaker to confirm whether the utterance has been accurately identified by the system.

The processes described herein for providing speech recognition may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
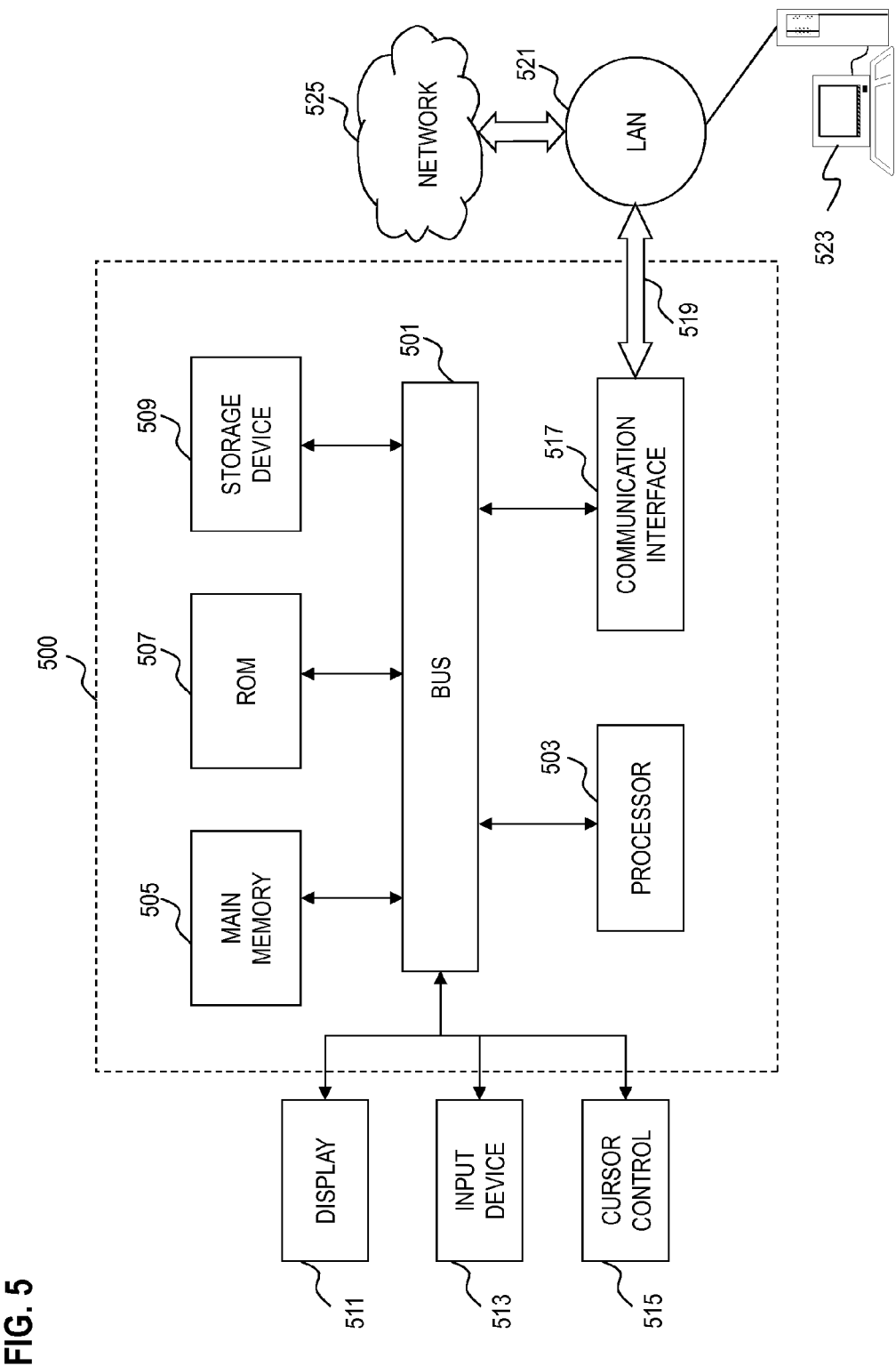
FIG. 5 is a diagram of a computer system that can be used to implement the various exemplary embodiments.

FIG. 5 illustrates a computer system 500 upon which an embodiment according to various exemplary embodiments can be implemented. For example, the processes described herein can be implemented using the computer system 500. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment contemplated herein, the processes described are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the certain embodiments. Thus, the exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:
1. A method comprising:
determining that a call has been redirected, wherein the call was initiated by an utterance corresponding to a first destination;
mapping the utterance to a second destination to which the call has been redirected; and
tracking a number of times redirection is necessitated for the utterance,
wherein the mapping of the utterance to the second destination is performed based on the tracked number of times.

2. A method as recited in claim 1, wherein the utterance corresponds to a phrase within a grammar database configured to store a plurality of phrases corresponding to respective service options.

3. A method as recited in claim 1, further comprising:
prompting a caller for the utterance; and
matching the utterance to an entry of a grammar database to determine routing to the first destination.

4. A method as recited in claim 3, further comprising:
updating, based on the mapping, a confidence database that is derived from the grammar database.

5. A method as recited in claim 3, wherein the grammar database is dynamically built.

6. A method comprising:
determining that a call has been redirected, wherein the call was initiated by an utterance corresponding to a first destination;
mapping the utterance to a second destination to which the call has been redirected;
accumulating results of the mapping step for a plurality of calls; and
adjusting an acoustic model in accordance with the accumulated results.

7. A method as recited in claim 6, wherein the acoustic model provides a confidence level for a speech recognition process that operates on the utterance.

8. An apparatus comprising:
at least one processor; and
at least one memory including computer program code for one or more programs,
the at least one memory and the computer program code configured to, with the at least one processor, cause the apparatus to perform at least the following,
determine that a call has been redirected, wherein the call was initiated by an utterance corresponding to a first destination,
map the utterance to a second destination to which the call has been redirected, and
track a number of times redirection is necessitated for the utterance,
wherein the mapping of the utterance to the second destination is performed based on the tracked number of times.

9. An apparatus as recited in claim 8, wherein the utterance corresponds to a phrase within a grammar database configured to store a plurality of phrases corresponding to respective service options.

10. An apparatus as recited in claim 8, wherein the acoustic model provides a confidence level for a speech recognition process that operates on the utterance.

11. An apparatus as recited in claim 8, wherein the apparatus is further caused to:
prompt a caller for the utterance; and
match the utterance to an entry of a grammar database to determine routing to the first destination.

12. An apparatus as recited in claim 11, wherein the apparatus is further caused to:
update, based on the mapping, a confidence database that is derived from the grammar database.

13. An apparatus as recited in claim 11, wherein the grammar database is dynamically built.

14. An apparatus comprising:
at least one processor; and
at least one memory including computer program code for one or more programs,
the at least one memory and the computer program code configured to, with the at least one processor, cause the apparatus to perform at least the following,
determine that a call has been redirected, wherein the call was initiated by an utterance corresponding to a first destination;
map the utterance to a second destination to which the call has been redirected;
accumulate results of the mapping step for a plurality of calls; and
adjust an acoustic model in accordance with the accumulated results.

15. A system comprising:
an interactive voice response unit configured to receive an utterance to initiate a call to a first destination;
speech recognition logic coupled to the interactive voice response unit and configured to process the utterance; and
a grammar database coupled to the speech recognition logic and configured to store a first phrase associated with the first destination and a second phrase associated with a second destination,
wherein the utterance is mapped to the second destination if the call is redirected;
wherein a number of times redirection is necessitated for the utterance is tracked, and
wherein the mapping of the utterance to the second destination is performed based on the tracked number of times.

16. A system as recited in claim 15, further comprising:
an acoustic model database coupled to the speech recognition logic and configured to provide a level of confidence for matching received utterances, as processed by the speech recognition logic, with the phrases.

17. A system as recited in claim 15, wherein the system is based at a telecommunication provider premises for providing subscriber service, and the utterance relates to one of a plurality of service options.

18. A system as recited in claim 15, wherein an acoustic model is adjusted in accordance with an accumulation of mapped utterances.

* * * * *